United States Patent [19]
Hosoi et al.

[11] Patent Number: 5,596,248
[45] Date of Patent: Jan. 21, 1997

[54] CONVERGENCE CORRECTING DEVICE

[75] Inventors: Kenichiro Hosoi; Takashi Iwami, both of Tokyo, Japan

[73] Assignee: Pioneer Electronic Corporation, Tokyo, Japan

[21] Appl. No.: 604,780

[22] Filed: Feb. 23, 1996

[30] Foreign Application Priority Data

Feb. 23, 1995 [JP] Japan .................................. 7-035678

[51] Int. Cl.[6] .................................................. H01J 29/51
[52] U.S. Cl. ........................................ 315/368.18; 348/807
[58] Field of Search ......................... 315/368.18, 368.21, 315/368.22; 348/807

[56] References Cited

U.S. PATENT DOCUMENTS 5,414,329  5/1995  George .............................. 315/368.23

*Primary Examiner*—Theodore M. Blum
*Attorney, Agent, or Firm*—Fish & Richardson P.C.

[57] ABSTRACT

A convergence correcting device in a CRT display apparatus is free from any necessity of adjustment of a convergence correction rate even if a raster size is changed. The convergence correcting device generates a modified blanking pulse having a pulse width which becomes larger as an amplitude of a deviated voltage becomes larger, and generates a convergence correction signal in accordance with the modified blanking pulse.

5 Claims, 7 Drawing Sheets

CONVERGENCE CORRECTING DEVICE

BACKGROUND OF THE INVENTION

1. Field of the Invention

The present invention relates to convergence correcting device in a CRT display apparatus (including an LCLV: Liquid Crystal Light Valve) using a cathode ray tube (called CRT hereinafter) having a two-dimensional display screen.

2. Description of the Related Art

Examples of the convergence correcting device as described above have been disclosed in Japanese Patent Laid-Open No.64-73882, Japanese Patent Laid-Open No.3-22784, and Japanese Patent Laid-Open No.6-133324.

In the conventional type of convergence correcting device as described above, V- and H-convergence correction signals are generated according to V- and H-synchronization data obtained from a composite video signal including not only video information to be regenerated, but also information concerning synchronization in both the vertical (V) and horizontal (H) directions, and convergence correction is executed by driving convergence coils in the V and H sides of a CRT on the basis of the correction signals.

In recent years, there have been developed CRT display apparatus compatible with the so-called multi-scan facility, in which not only a television signal based on the NTSC system but also a high resolution video signal for computer software can be displayed on the same CRT display screen to satisfy the needs such as availability in multimedia. The CRY display apparatus have been disclosed, for instance, in Japanese Patent Publication No.61-6828, or in Japanese Patent Laid-Open No.61-96874.

In the CRT display apparatus compatible with the multi-scan facility as described above, in addition to the composite video signal based on the general NTSC system, various types of composite signals are used, and a position in the time axis to the H-sync. or V-sync. video data signal is not always constant. If, for this reason, a convergence correction signal including a parabola wave is generated on a time axis based on a sync signal, the convergence correction can not always be executed correctly.

For this reason, as disclosed by the applicant for the present invention in Japanese Patent Application No.6-130596, there has been developed a convergence correcting device base on a system in which each point of a first transmission and a last transmission of a parabola wave in a convergence correction signal coincides with each point of a last transmission and a first transmission of either a V-blanking pulse or a H-blanking pulse.

FIG. 1A shows how a voltage P for a V-side convergence correction signal obtained by the convergence correcting device is changed on a central line C–C' on the CRT display screen D of the CRT. Namely, the voltage P for the V-side convergence signal is a parabola wave which becomes maximum at the upper edge as well as at the lower edge of the display screen D and becomes minimum at the central portion thereof in the vertical direction. The maximum and minimum amplitudes in the voltage P are adjusted by an operator checking those on an actual screen according to a sequence of the convergence adjustment. In a Japanese Patent Application No.6-130596, an adjusting circuit for the convergence corrected voltage as described above is disclosed in FIG. 4 of the accompanying drawings thereof and in the detailed description corresponding thereto in the specification thereof.

The trailing and leading edges 1 and 2 of the V-blanking pulse corresponding to a start point and an end point of the parabola wave for the voltage P in the convergence correction signal in FIG. 1A coincide with the upper edge and the lower edge of the display screen D, so that desired convergence correction can be achieved even if there appear changes in a position on the time axis of each V-sync video signal having a different scan speed respectively.

By the way, in a CRT display unit for a personal computer or the like, a raster size of the displayed picture is sometimes different from the raster size which is the expected raster size for the original video signal to be displayed, but only one portion of the video picture represented by the video signal may be displayed with various raster sizes. Herein, the term of "raster size" is defined as the maximum scanning scale on the CRT display screen.

For instance, as shown in FIG. 1B, in case where a size of the V-deflection in the CRT display unit (namely a raster size) is made larger, and an original video signal is extended in the V-direction to display one portion of the original video signal in an enlarged scale in the V-direction, the raster size RS extends, as shown in the figure, to outside of the screen of the display screen D on the CRT. In this case, it is obvious that a start point 3 and an end point 4 of the parabola wave P' in the V-side convergence signal corresponding to the points of the trailing edge of an earlier V-blanking pulse and the leading edge of the succeeding one are positioned respectively before and behind on the time axis the start point and end point 1 and 2 of the parabola wave P corresponding to the reference raster size which matches the size of the display screen D. Even in the case where the parabola wave extends on the time axis as described above, the amplitude of the parabola wave P' at the start and end points 3 and 4 thereof are the same as those adjusted when the reference raster size is previously employed for the reference raster size, so that the amplitude of the parabola wave becomes smaller than that in a case where an amplitude of a parabola wave has a standard raster size at the time points 1 and 2 each corresponding to the upper edge and lower edge of the display screen D.

For this reason, as shown in FIG. 1B, in a case where the raster size is enlarged, it is required that characteristics in the convergence correction voltage generating circuit are adjusted again so that a maximum amplitude of the convergence corrected voltage will be made larger.

OBJECT AND SUMMARY OF THE INVENTION

It is an object of the present invention to provide a CRT display apparatus which does not require re-adjustment in a convergence correction signal generating circuit even if the raster size is changed.

According to the present invention, there is provided a convergence correcting device in an image display apparatus in which V- and H-deflection voltages and V- and H-blanking pulses are generated on the basis of a composite video signal supplied thereto which are used to drive a CRT so as to display a video signal represented by the composite video signal as a two-dimensional image, which comprises:

modified V-blanking pulse generating means for generating a modified V-blanking pulse having a pulse width which becomes larger as an amplitude of the V-deflection voltage becomes larger, modified H-blanking pulse generating means for generating a modified H-blanking pulse having a pulse width which becomes larger as an amplitude of the H-deflection voltage becomes larger, and convergence signal generating and correcting means for generating V- and H-convergence signals in accordance with each of the modified V- and H-blanking pulses and executing convergence correction for the CRT by means of said V- and H-convergence signals.

The convergence correcting device according to the present invention generates a modified blanking pulse having a pulse width corresponding to a raster size, generates a parabola wave having a desired maximum amplitude, that is, a convergence correction signal within a period from the trailing edges of one of the modified blanking pulse to the leading edge of the succeeding modified blanking pulse, and executes convergence correction on the basis of the convergence correction signal.

DETAILED DESCRIPTION OF THE PREFERRED EMBODIMENTS

Figure 1A:
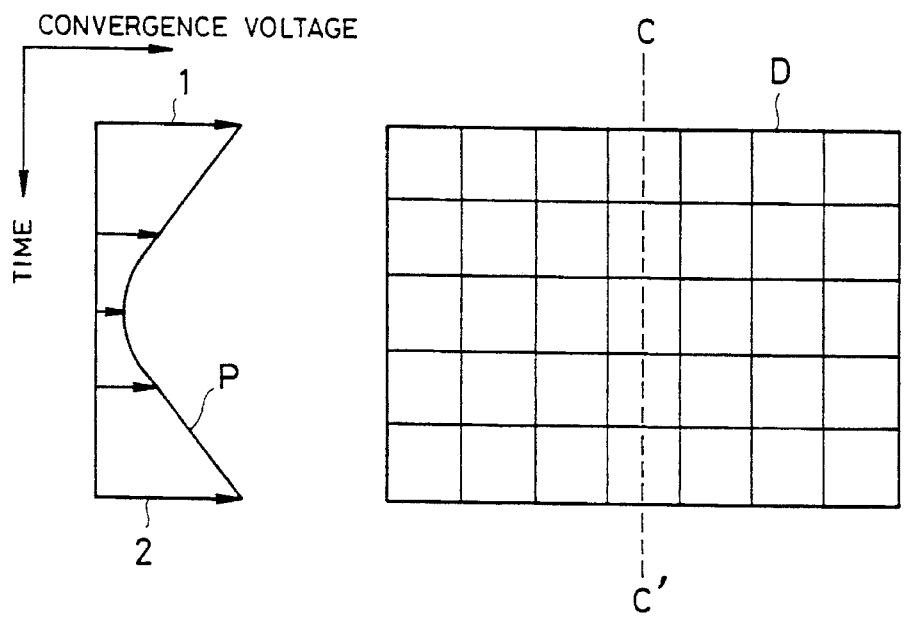
FIG. 1A and FIG. 1B are views each showing a relation between a CRT display screen and a convergence correction voltage.
Figure 1B:
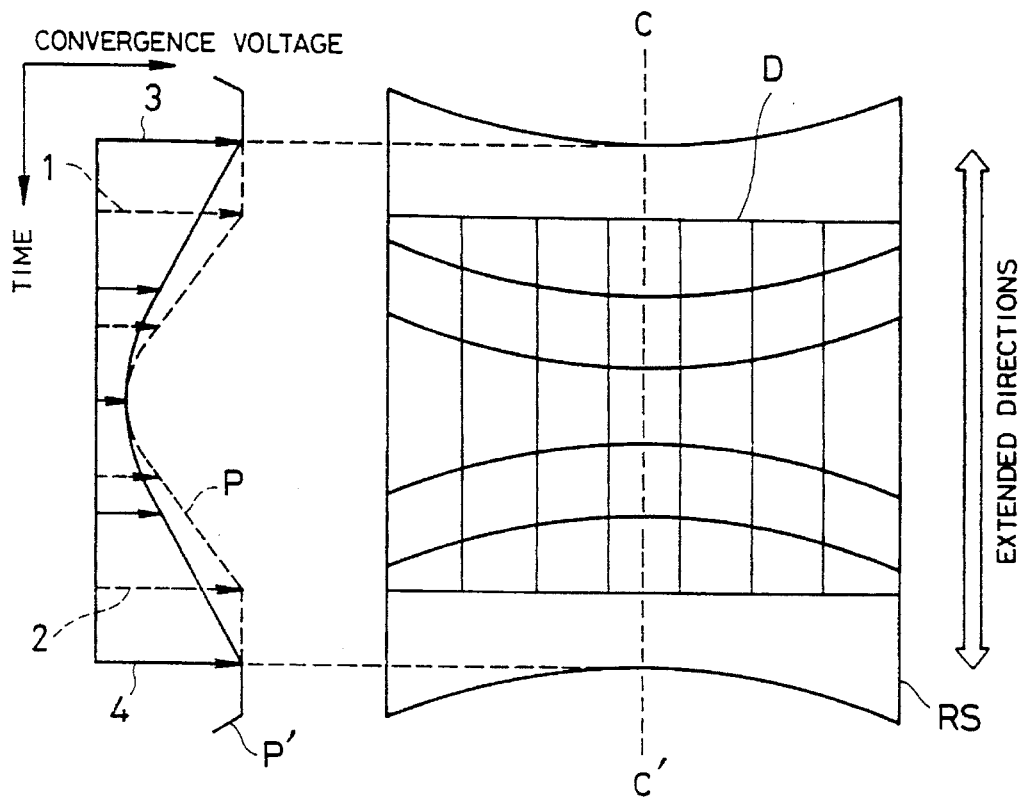
Figure 2:
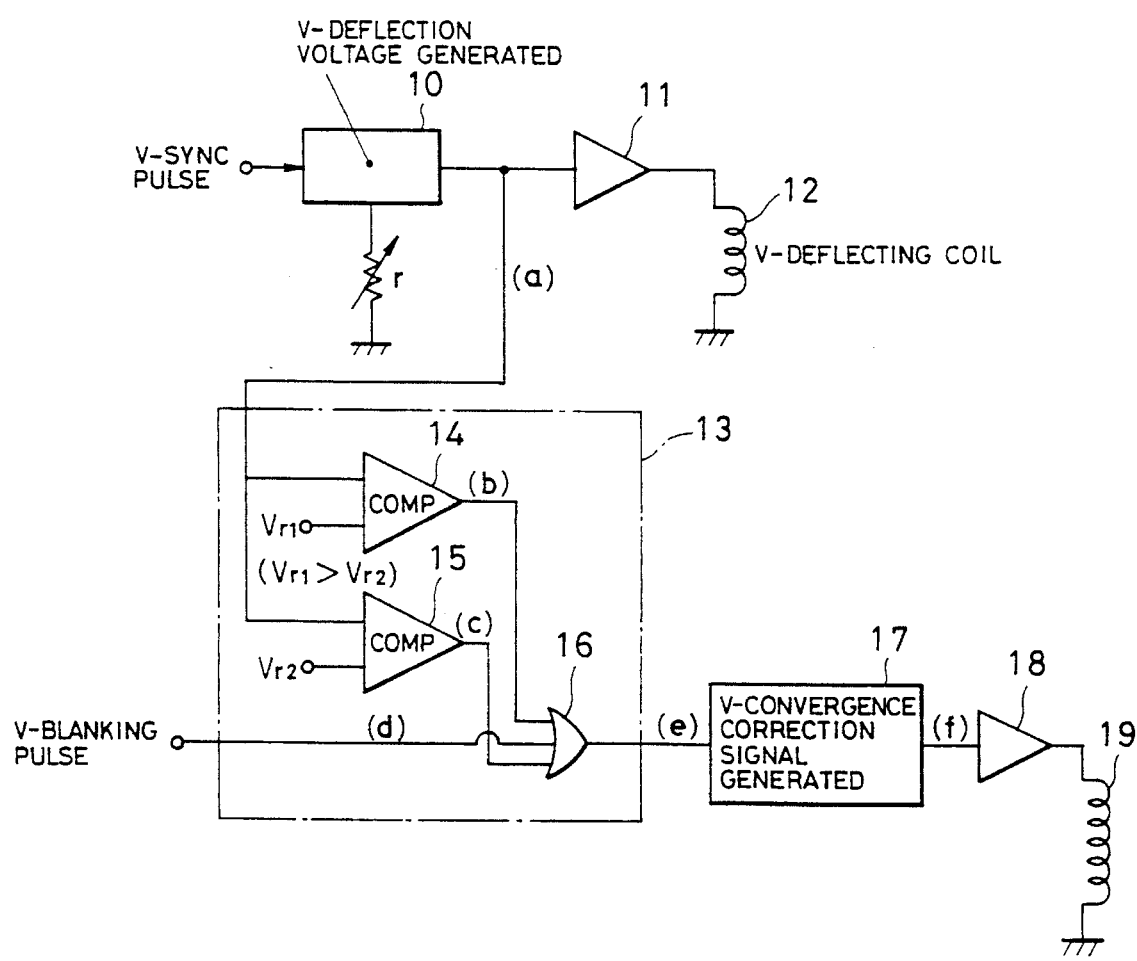
FIG. 2 is a circuit diagram showing a convergence correcting circuit according to the present invention.

FIG. 2 shows a convergence correcting circuit in the V-direction according to the present invention. In the circuit, at first, a V-sync pulse which is separated and extracted from a supplied composite video signal by the well known sync signal separating circuit not shown herein is supplied to an input terminal of a V-deflection voltage generating circuit 10.

Figure 3:
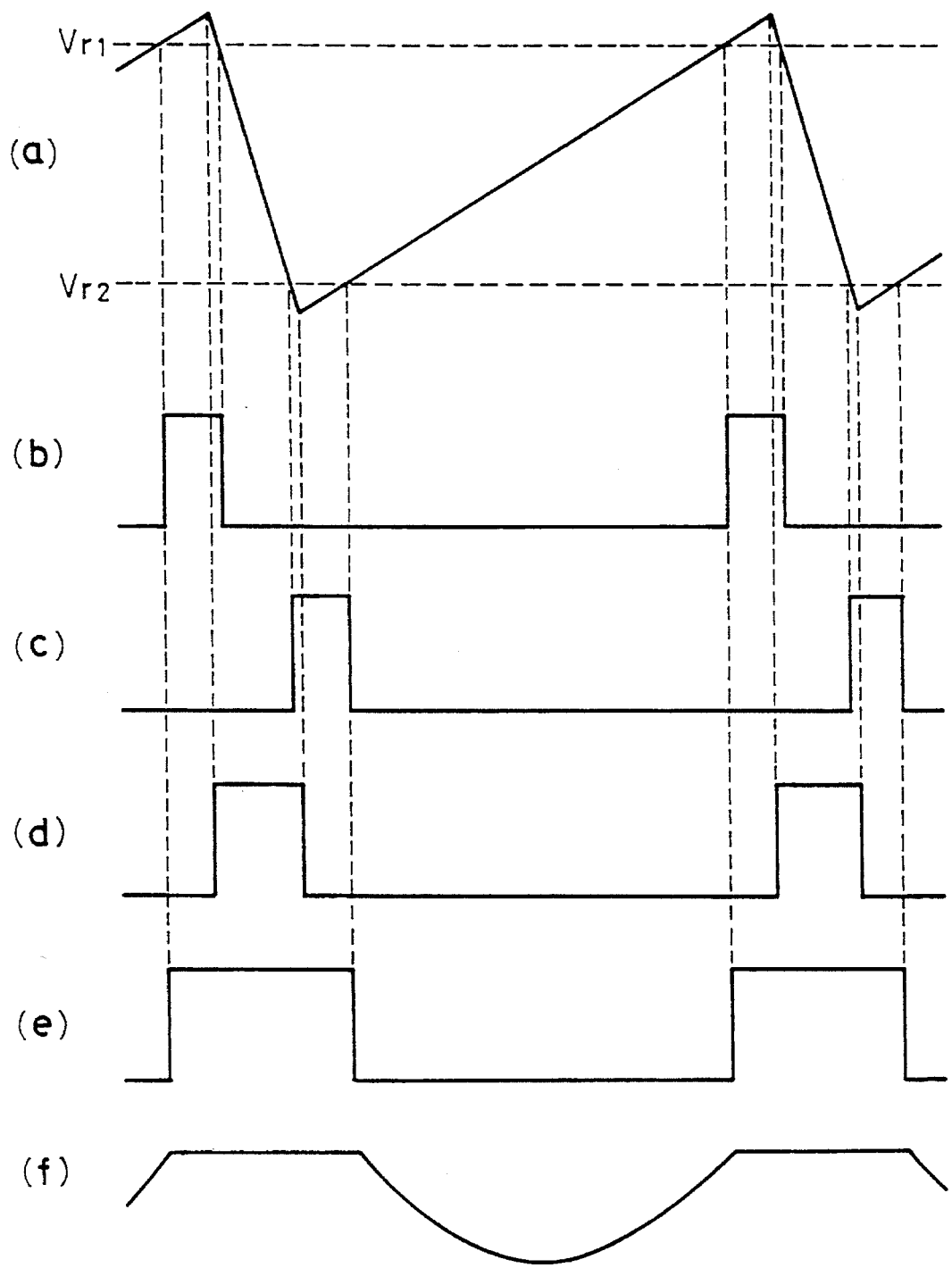
FIG. 3 is a waveform chart showing a signal waveform appearing in the circuit in FIG. 2.

The V-deflection voltage generating circuit generates a saw-tooth wave voltage as shown in FIG. 3(a), and supplies the voltage to a V-deflection coil of a CRT (not shown herein) via an amplifier 11, so that an electron beam generated in the CRT is displaced in the V-direction. The V-deflection voltage generating circuit functions to change a maximum amplitude of the generated a V-deflection voltage of the saw-tooth wave in accordance with, for instance, a resistance value of a variable resistor in order to change a raster size for displaying only a certain one portion of a video signal on the CRT screen while enlarging or by reducing its size. Although a resistance value of the variable resistor can manually be adjusted, it may be made to be automatically adjusted with a certain circuit arrangement. Further, a maximum amplitude of the V-deflection voltage can also be adjusted so that the adjustment thereof can be changed in accordance with the supplied command data, but any how, detailed description thereof is not made herein because it is well known that a maximum value of the V-deflection voltage is adjusted to change a raster size.

On the other hand, a V-deflection voltage is supplied to one input terminal of each of comparators 14 and 15 in a modified blanking pulse generating circuit 13. A reference voltage Vr1 is supplied to the other input terminal of the comparator 14, and a reference voltage Vr2 lower than the reference voltage Vr1 is supplied to the other input terminal of the comparator 15. The comparator 14 produces, as shown in FIG. 3(b), a high voltage which is a logic "1" as far as the supplied V-deflection voltage is higher than the reference voltage Vr1, and the comparator 15 produces, as shown in FIG. 3(b), a high voltage which is a logic "1" when the supplied V-deflection voltage is higher than the reference voltage Vr2. Output voltages from the comparators 14 and 15 are supplied to two inputs of an OR-gate 16 and the V-blanking pulse is supplied to the remaining input of the OR gate 16 as shown in FIG. 3(d). The V-blanking pulse is generated by the V-blanking pulse generating circuit not shown herein, but a pulse width of the V-blanking does not change so long as synchronization of a V-sync pulse is not changed even if a raster size is changed. It should be noted that the V-blanking pulse generating circuit is also well known, so that detailed description thereof is not made herein.

The OR gate 16 generates a pulse having a pulse width which continues so long as any one of the inputted pulses exists as shown in FIG. 3(e). Namely, such pulse is a modified blanking pulse. The modified blanking pulse is supplied to a V-convergence correction signal generating circuit 17. The V-convergence correction signal generating circuit 17 generates a V-convergence correction signal including a parabola wave having such a waveform as shown in FIG. 3(f), and supplies the signal to a V-convergence coil of the CRT via an amplifier 18.

Figure 4:
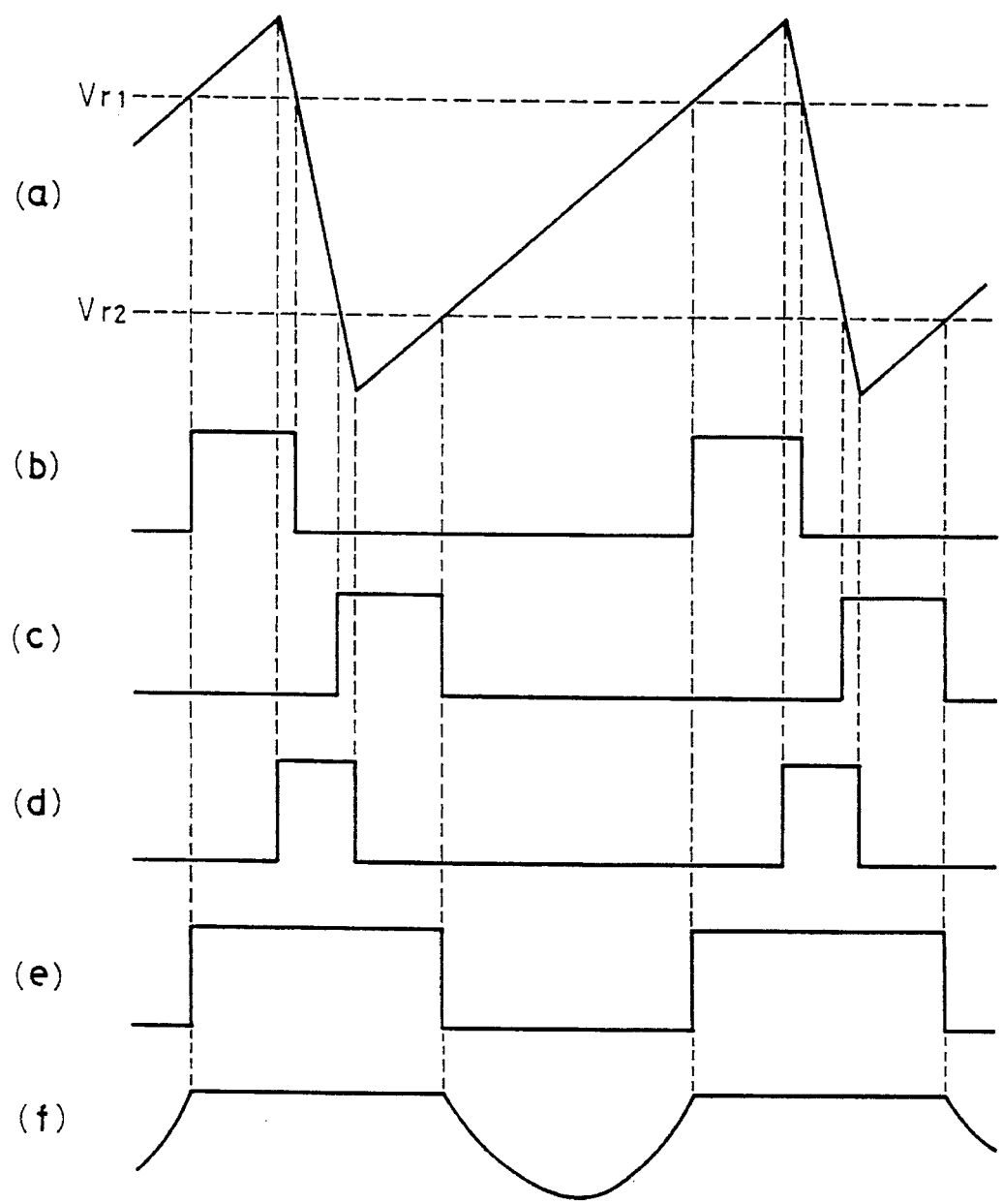
FIG. 4 is a waveform chart showing a signal waveform in a case where a raster size is changed in the circuit of FIG. 2.

When the raster size is adjusted by, for instance, adjusting a resistance value of a resistor r, a maximum amplitude of the V-deflection voltage becomes larger as shown in FIG. 4(a). However, the cycle of the V-sync pulse is not changed, which causes that an inclination of a saw-tooth wave for the V-deflection voltage becomes larger.

When, as described above, the maximum amplitude of the V-deflection voltage becomes larger, which makes the raster size enlarged, the input pulses into the OR gate 16 take such waveforms as shown in FIGS. 4(b), 4(c), and 4(d), and the output pulse from the OR gate 16, i.e., the modified blanking pulse takes a waveform having a longer pulse width as shown in FIG. 4(e). For this reason, a voltage of a V-convergence correction signal takes such a waveform as shown in FIG. 4(f), and eventually, the V-convergence correction signal having an equal maximum amplitude can be obtained only in a visible area on the display surface D without respect to any changes of the raster size.

Figure 5:
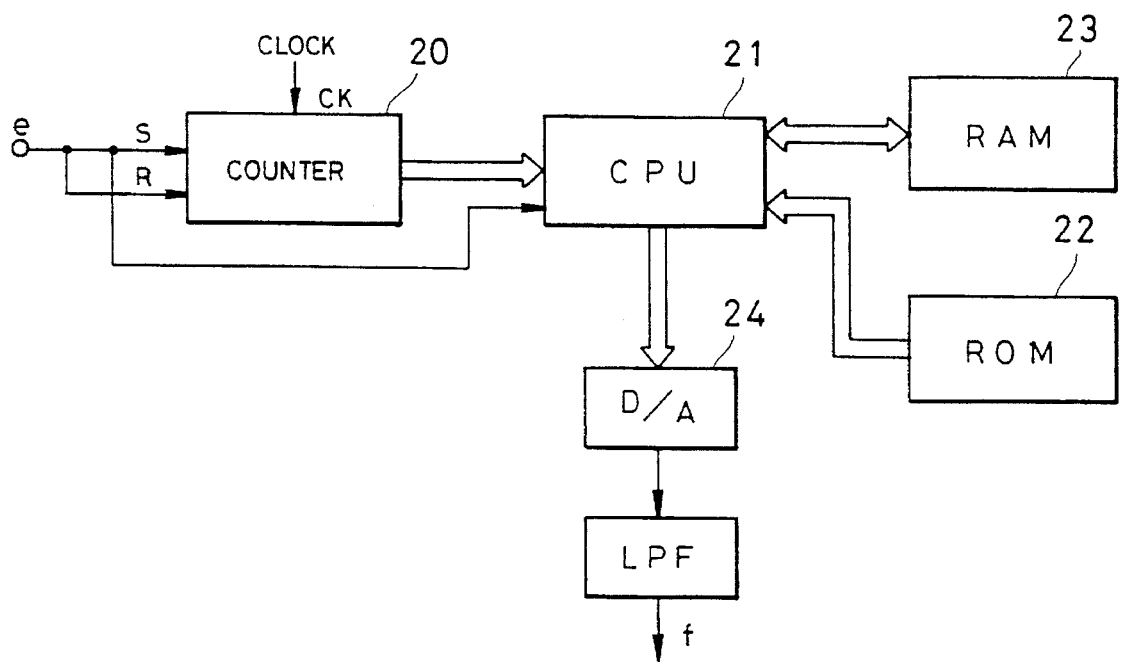
FIG. 5 is a block diagram showing an embodiment of a convergence correction signal generating circuit in the circuit shown in FIG. 2.

FIG. 5 shows a concrete circuit arrangement of a V-convergence correcting circuit 17 shown in FIG. 2.

A modified blanking pulse e from the OR gate 16 is supplied to an input terminal circuit of FIG. 5. A counter 20 is set at the trailing edge of the modified blanking pulse, starts counting clock pulses, and is reset at the leading edge of the modified blanking pulse to terminate the counting operation.

On the other hand, a central processing unit (CPU) 21 fetches a count value for the counter 20 under the control by a specified program stored in a ROM 22, extracts a data value corresponding to the count value from a data map stored in a RAM 23 in a period of a V-convergence corresponding to the size of fetched count value, and supplies a data value corresponding to a parabola waveform which lowers once from the maximum amplitude and again returns to the maximum amplitude at equal time interval in the period of V-convergence. Output from the D/A converting circuit 24 is supplied to the V-convergence coil 19 as a V-convergence correction signal via an LPF 25.

Figure 6:
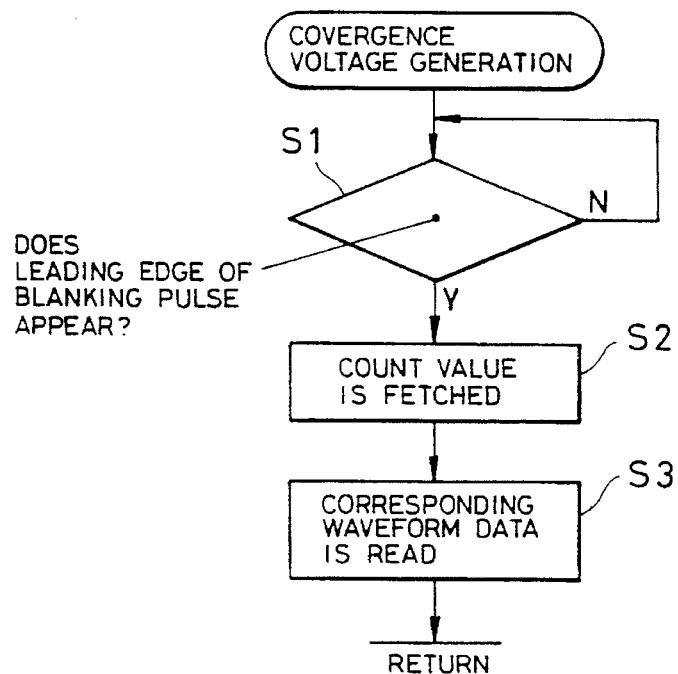
FIG. 6 is a flow chart showing operations for a computing circuit in the circuit shown in FIG. 5.

FIG. 6 shows a subroutine illustrating one example of the specified program for executing the operation of the CPU 21. Namely, the convergence voltage generating subroutine is executed by interrupting into the main routine (not shown) of the CPU 21. At first, when a trailing edge of the modified V-blanking pulse is detected (step S1), a count value of the counter 20 for the previous time is fetched thereto (step S2). The previous count value indicates a time period from the trailing edge of the previous one of the modified V-blanking pulse to the leading edge of the current one, and a waveform data corresponding to the time period thereof is extracted from the data map in the RAM 23 (step S3).

A device for generating a convergence correction signal on the basis of a waveform data is disclosed in a Japanese Patent Laid-Open No.63-19973.

The convergence correcting circuit shown in FIG. 2 has been described as a convergence correcting circuit in the V direction, but it is clear that the particular convergence correcting circuit may be used for the convergence correction in the H direction by appling a H-sync pulse and a H-blanking pulse to this circuit as input signals. In this case, a convergence generating circuit 17 is required to adjust, for instance, contents of the data map prepared in the RAM 23 so that a parabola waveform voltage suitable for the convergence correction in the H direction is generated.

In a case where the circuit shown in FIG. 2 is used as the convergence correcting circuit in the H direction, a modified blanking pulse generating circuit is connected to a H-deflection coil system in parallel with the H-deflection pulse generating circuit, which may adversaly effect the whole H-deflection circuit system.

Figure 7:
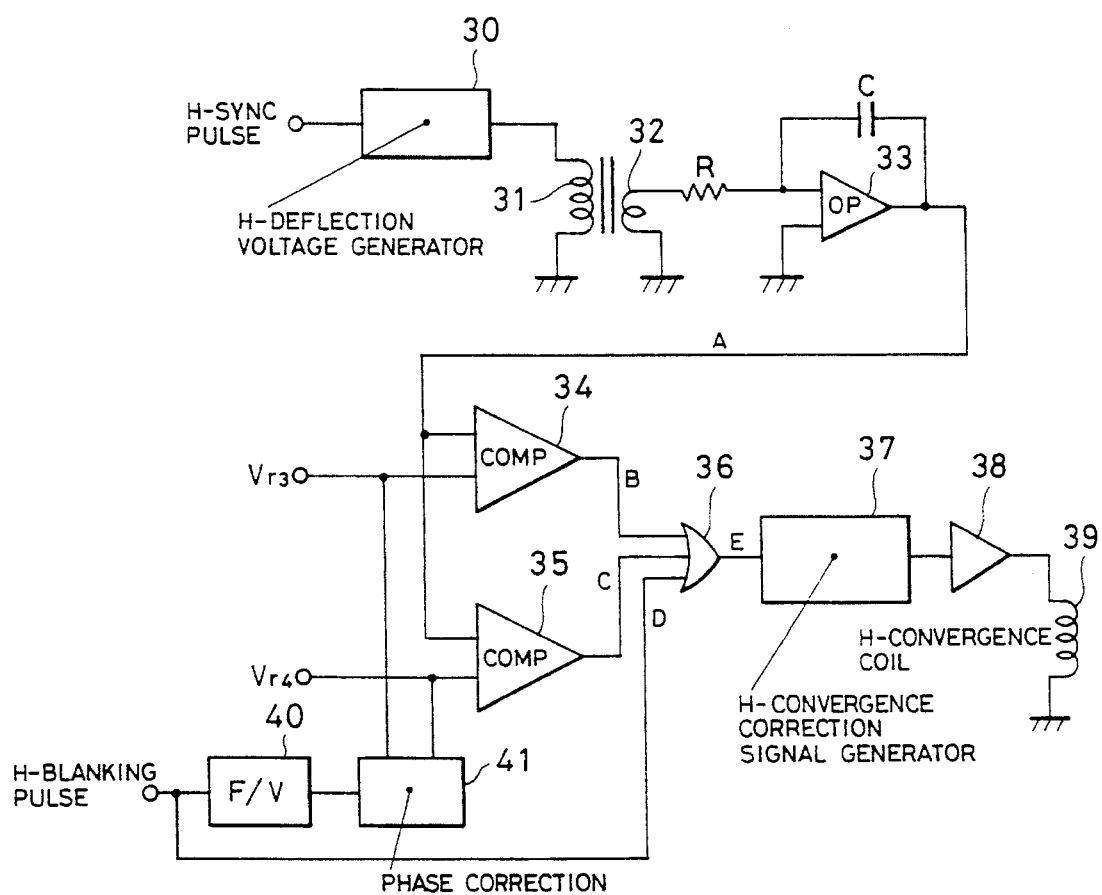
FIG. 7 is a circuit diagram showing a modified example when a H-convergence correcting circuit is employed for the circuit in FIG. 2.
Figure 8:
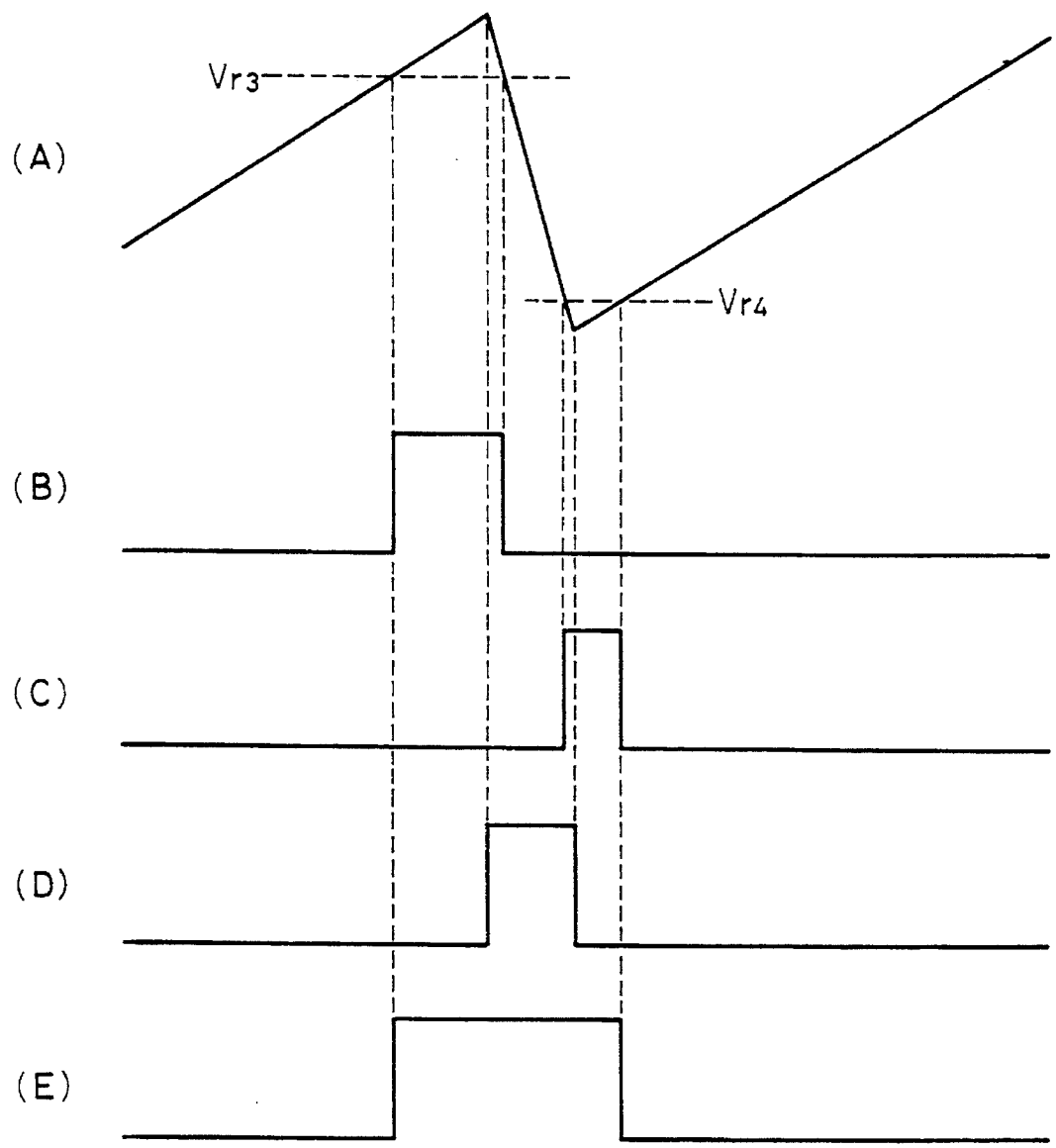
FIG. 8 is a waveform chart showing a signal waveform appearing in the circuit in FIG. 7.

To solve the problem described above, there is provided such an H-convergence correcting circuit as shown in FIG. 7. Namely, an H-pulse extracting coil 32 is provided which is magnetically compled with a H-deflection coil 31 and is driven by a H-deflection voltage supplied from the H-deflection voltage generating circuit 30 which is in turn responsive to the H-sync pulse. The H-pulse extracting coil 32 extracts an H-pulse having such a waveform as shown in FIG. 8(A). The H-pulse is converted into a pseudo-H-deflection voltage by means of an integrated circuit consisting of a resistor R, a capacitor C and an operational amplifier 33. The pseudo-H-deflection voltage (A) is supplied to one input terminal of each of comparators 34 and 35 respectively, while reference voltages Vr3 and Vr4 (Vr3>Vr4) are supplied to the other input terminal of each comparator. The comparator 34 generates a logic "1", namely a high voltage as shown in FIG. 8(B) as long as the pseude-H-deflection voltage (A) is higher than Vr3, and the comparator 35 generates a logic "1" namely a high voltage as shown in FIG. 8(C), as long as the pseude-H-deflection voltage (A) is lower than Vr4. Outputs from the comparators 34 and 35 are supplied to two inputs of an OR gate 36, while a H-blanking pulse as shown in FIG. 8(D) is supplied to the remaining input thereof, and the OR gate 36 generates a modified H-blanking pulse as shown in FIG. 8(D) and supplies the modified H-blanking pulse to a H-convergence correction signal generating circuit 37. The H-convergence correction signal generating circuit 37 has such configuration as shown in FIG. 5, and supplies a convergence correction signal to a H-convergence coil 39 via an amplifier 38.

In the H-convergence correcting circuit shown in FIG. 7, a F/V convertor 40 for generating a voltage corresponding to a frequency of a H-blanking pulse and a phase correcting circuit 41 for generating a phase corrected voltage corresponding to an output from the F/V convertor 40 are provided for compatibility with the multi-scan facility. The phase corrected voltage is superimposed on the voltages Vr3 and Vr4. If a H-sync frequency is changed, the phase corrected voltage is changed, so that the reference voltages Vr3 and Vr4 are corrected thereby causing a phase of the modified H-blanking pulse to change. Accordingly, a phase of a convergence correction signal is changed so that a correction lag due to frequency characteristics in the H-convergence circuit system is previously compensated.

The present invention can be applied to a projection type of displayer for projecting an image from three CRTs of RGB in addition to a display type in which a CRT is directly used as a direct display screen.

As clearly understood from the description above, with the convergence correcting device according to the present invention, although a raster size in the CRT display device is changed, a point of time when a maximum amplitude of a convergence corrected voltage appears coincides with an edge section of the display screen namely an edge section of a visible area thereof. Thus it is not necessary to change conveniently a maximum value of the convergence corrected voltage even if the raster size is changed and also re-adjustment of the convergence is not required even if the raster size is changed.

What is claimed is:

1. A convergence correcting device in an image display apparatus which generates V- and H-deflection voltages and V- and H-blanking pulses on the basis of a composite video signal and drives a CRT by said V- and H-deflection voltages and V- and H-blanking pulses so as to display the video information carried by said composite video signal as a two-dimensional image, which comprises:

modified V-blanking generating means for generating a modified V-blanking pulse having a pulse width which becomes larger as an amplitude of said V-deflection voltage becomes higher, modified H-blanking pulse generating means for generating a modified H-blanking pulse having a pulse width which becomes larger as an amplitude of the H-deflection voltage becomes higher, and convergence signal generating and correcting means for generating V- and H-convergence signals in accordance with to respective modified V- and H-blanking pulses and executing convergence correction for the CRT.

2. The convergence correcting device according to claim 1, wherein said modified V-blanking pulse generating means comprises a first detection pulse generating means for generating a first detection pulse having a pulse width which lasts as long as the V-deflection voltage is higher than a first threshold voltage and generating a second detection pulse having a pulse width which lasts as long as the V-deflection voltage is lower than a second threshold voltage which is lower than the first threshold voltage, and V-pulse generating means for generating a certain pulse having a pulse width which lasts so long as at least any of the V-blanking pulse, first detection pulse and second detection pulse exists, said certain pulse being said modified V-blanking pulse.

3. The convergence correcting device according to claim 1, wherein said modified H-blanking pulse generating means comprises a pseudo-H-deflection voltage generating means for generating a pseudo-H-deflection voltage by integrating an H-deflection pulse obtained from a secondary coil magnetically coupled with an H-deflection coil of said CRT, a second detection pulse generating means for generating a third detection pulse having a pulse width which lasts as long as said pseude-H-deflection voltage is higher than a third threshold voltage and also generating a fourth detection pulse having a pulse width having a pulse width which losts as long as said pseude-H-deflection voltage is lower than a fourth threshold voltage which is lower than said third threshold voltage, and an H-pulse generating means for generating a certain pulse having a pulse width which last so long as at least any of the H-blanking pulse, third detection pulse, and fourth detection pulse exists, said certain pulse being the modified H-blanking pulse.

4. The convergence correcting device according to claim 3, wherein said second detection pulse generating means includes a phase adjusting means for adjusting phases of the third and fourth detection pulses by means of adjusting a level of the third threshold voltage as well as that of the fourth threshold voltage in accordance with a frequency of the H-blanking pulse.

5. A convergence correcting device according to claim 3, wherein said phase adjusting means includes an F-V convertor for generating a voltage according to a frequency of the H-blanking pulse and a voltage superimposing means for superimposing an output voltage from the F-V convertor onto said third and fourth threshold voltages.

* * * * *